3,321,311
PHOTOGRAPHIC MATERIAL
Johan Lodewijk Verelst, Kontich, Belgium, assignor to Gevaert Photo-Producten N.V., Mortsel-Antwerp, Belgium
No Drawing. Filed July 29, 1963, Ser. No. 298,411
Claims priority, application Netherlands, July 30, 1962, 281,535
10 Claims. (Cl. 96—83)

The present invention relates to a photographic film and more particularly to a photographic stripping film containing a hydrophobic, flexible film support of polyester.

Photographic stripping film is used for instance for photographic montages, for producing photographically patterns for screen printing and for producing etching resists by means of which printing plates for photogravure may be made.

Photographic stripping film mainly consists of a hydrophobic flexible film support which on the one side may be provided with an antihalation layer and on the other side with a stripping layer, a flexible hydrophobic membrane and a light-sensitive layer successively.

The stripping layer which adheres the hydrophobic membrane to the hydrophobic film support must be so that during the mechanical cutting operation the treatment in the photographic baths and further treatments these two layers adhere firmly one to the other without preventing, however, the separation of these layers after treatment in the photographic baths.

For the manufacture of a hydrophobic flexible film support use is made e.g. of cellulose esters, such as cellulose triacetate, cellulose acetobutyrate and cellulose acetopropionate, while in most cases cellulose nitrate is used for the manufacture of the flexible hydrophobic membrane.

A suitable stripping layer for being applied between a hydrophobic flexible membrane and a hydrophobic flexible film support manufactured from the above cited materials is described in the United States patent specification 2,638,417 and consists of a mixture of ethylcellulose (from 6 to 9 parts) and cellulose nitrate (from 4 to 1 part).

Especially in view of a good dimensional stability, there is a trend nowadays towards the use of a stripping film, the hydrophobic flexible film support of which consists of polyester. For this purpose, however, no stripping layers can be used which are similar to those used for a stripping film comprising a hydrophobic flexible film support of a cellulose ester as mentioned above.

It has now been found that an excellent but nevertheless not too strong adhesion between the hydrophobic flexible membrane and the hydrophobic flexible film support of polyester of a photographic stripping film can be obtained by applying between said two layers a thin stripping layer, the binding agent of which mainly consists of a copolymerizate containing diolefine, acrylonitrile and/or methacrylonitrile recurring units, said acrylonitrile and/or methacrylonitrile recurring units being present in an amount between 5 and 60% of the total amount of structural units.

The thickness of the hydrophobic film support generally is comprised between about 50 and 200µ. As suitable polyesters for this film support may be cited e.g. polyethylene terephthalate, polyesters of the polycarbonate type, polybisphenol esters of dicarboxylic acids and bisphenols, polybisphenol esters of aromatic disulfonic acids and bisphenols. Especially when using a polyethylene terephthalate sheet as a hydrophobic film support, very good results were obtained. The mechanical properties of the hydrophobic film support can still be improved by stretching it in one or two directions.

As layer-forming substance for the manufacture of the hydrophobic flexible membrane of a stripping film according to the present invention may be cited among others: cellulose nitrate, cellulose triacetate, cellulose propionate, cellulose acetobutyrate, cellulose acetopropionate, cellulose diacetate, a mixture of ethylcellulose and cellulose nitrate, other single or mixed esters of carboxylic acids with cellulose, polyamides, polyesters, polyesters of the carbonate type, poly(vinylchloride), poly(vinyl esters) and poly(vinyl acetals).

The binding agent of the stripping layer mainly consists of a copolymerizate as described above. The structural diolefine units may be e.g. butadiene, isoprene and chloroprene units. As already said the amount of acrylonitrole and/or methacrylonitrile units in the copolymer varies between 5 and 60% but preferably between 22 and 40%. Especially copolymers of butadiene and acrylonitrile are very appropriate as binding agents for the stripping layer. In addition to said units, still other structural units such as styrene units may be present in the copolymerizate. Mixtures of copolymers are also appropriate as binding agent for the stripping layer.

In the stripping layer other ingredients may be incorporated such as stabilizers, antioxidants, plasticizers such as triphenyl phosphate, tricresyl phosphate, dimethoxyethyl phthalate, tributyrine, butylphthalylbutyl glycolates, cyclohexyl phthalate and ethyleneglycol monobutylether stearate, plastics and resins such as copoly(vinyl chloride/vinyl acetate/maleic anhydride), copoly(vinyl acetate/vinyl stearate) and copoly(vinyl acetate/vinyl laurate), and rubbers such as sulfochlorated polyethylene, polyamides, arylsulfonamide-formaldehyde resins and reaction products of polyamides and diisocyanates.

The stripping layer according to the present invention is applied onto the hydrophobic film support from a solution of a described copolymer and of occasional additives in organic solvents mostly chlorinated aliphatic hydrocarbons such as methylene chloride, 1,2-dichlorethane, but also mixtures of solvents such as of acetone and ethyl acetate.

The hydrophobic flexible membrane is coated onto the polyester film support which is provided with a stripping layer, whereupon the light-sensitive emulsion layer(s) is (are) applied onto said membrane, mostly after preliminarily having coated an adhesive layer and in some cases one or more intermediate layers.

Generally the adhesion caused by the stripping layer is directly proportional to its thickness. In order to obtain an adhesion which is favorable for a stripping film according to the present invention, the thickness of the stripping layer usually is chosen in such a way that 0.050 to 2 g. and preferably 0.5 to 1 g. of solid substance is present per square meter.

This thickness may be modified strongly by the addition of products which increase or decrease the adhesive properties and is highly dependent on the nature of the solvent from which the stripping layer is coated.

In the manufacture of a stripping film according to the present invention it is further surprising that the drying circumstances for the stripping layer seems to influence only slightly the properties or the quality of this layer.

A stripping film according to the present invention has an excellent dimensional stability and shows an amply sufficient adhesion between the flexible membrane and the polyester film support. This adhesion is not too strong either so that the separation may be carried out easily at the required moment.

The further composition of the stripping film i.e. the composition besides that of the essential layers may vary. So, if the stripping film is a gravure film, a non-hardenable layer as described in the Belgian patent specification 627,076 may be applied between the hydrophobic flexible membrane and the light-sensitive emulsion layer and a plasticizer as described in the French patent specification 1,281,283 may be present in the former.

The following examples illustrate the present invention. (The K-values of cellulose nitrate were determined according to the formula of H. Fikentscher, Cellulosechemie, Tome XIII, 1932, p. 58.)

EXAMPLE 1

A. *Composition of a screen printing in the indicated sequence*

(1) A hydrophobic flexible film support of 180μ of polyethylene terephthalate.

(2) A stripping layer applied according to the knife coating system in proportion of 1 liter per 32 sq. m. from the following solution:

| | |
|---|---|
| Copoly(butadiene/acrylonitrile) (67/33) _____g__ | 20 |
| Methylene chloride _____cm.$^3$__ | 250 |
| 1,2-dichloroethane _____cm.$^3$__ | 500 |
| Ethyl acetate _____cm.$^3$__ | 230 |

This layer is dried at 70° C.

(3) A hydrophobic flexible membrane applied according to the knife coating system from the following solution:

| | |
|---|---|
| Cellulose nitrate (K-value: 15) _____g__ | 5 |
| Diethylether _____cm.$^3$__ | 360 |
| Ethanol _____cm.$^3$__ | 590 |
| n-Butanol _____cm.$^3$__ | 50 |

This layer is dried at 80° C. and is applied in such a way that about 800 mg. of cellulose nitrate are present per sq. m.

(4) A subbing layer applied from the following coating solution in proportion of 1 liter per 50 sq. m.:

| | |
|---|---|
| Gelatin _____g__ | 10 |
| Water _____cm.$^3$__ | 40 |
| Acetic acid _____cm.$^3$__ | 4 |
| Methanol _____cm.$^3$__ | 960 |

(5) A light-sensitive emulsion layer applied in such a way from the following dispersion that after drying 14 g. of solid substance are present per sq. m.:

| | cm.$^3$ |
|---|---|
| Orthochromatic gelatino-silver bromoiodide emulsion (1 mol percent of iodide) with a gelatino/silver nitrate ratio of 4/1 and a very strong gradation | 100 |
| Water | 15 |

5% aqueous solution of the compound

H$_3$C—C(=N—N)—C(=O)=CH—C(COCH$_3$)=CH—C(NaO—C=N—N)—C—CH$_3$ with SO$_3$Na groups on the aromatic rings ___ 1

| | |
|---|---|
| 50% aqueous urea | 3 |
| 1.25% aqueous solution of tetradecyl sodium sulfate | 1 |

(6) A light-sensitive emulsion layer from the following dispersion applied in such a way that after drying 4 g. of solid substance remain per sq. m.:

| | cm.$^3$ |
|---|---|
| Orthochromatic emulsion as described above | 20 |
| Water | 73 |
| Gelatin | 3.2 |

5% aqueous solution of the compound

H$_3$C—C(=N—N)—C(=O)=CH—C(COCH$_3$)=CH—C(NaO—C=N—N)—C—CH$_3$ with SO$_3$Na groups on the aromatic rings ___ 1

| | |
|---|---|
| 50% aqueous urea | 2 |
| 1.25% aqueous solution of tetradecyl sodium sulfate | 1 |

The described film for screen printing bears 18 g. of light-sensitive emulsion per sq. m.

B. *Manufacture of a pattern for screenprinting*

The film for screen printing described above is exposed through its back to a line transparency and then tanning developed. Then the image-wise tanned film for screen printing is washed out in warm water in such a way that only the exposed parts remain. This image-wise tanned and washed resist is dried in contact with the screen whereupon the hydrophobic flexible polyethylene terephthalate film support is removed by stripping off. Till now this film support has taken care of an excellent dimensional stability. On the exposed areas where the hydrophobic flexible membrane sticks to the tanned gelatin, the hydrophobic membrane can be easily stripped off but on the non-exposed areas the thin hydrophobic membrane has no assistance of the tanned gelatin so that it tears and remains adhering onto the film support. A pattern for screen printing with completely open non-exposed parts is thus obtained.

EXAMPLE 2

A. *Composition of a film for screen printing*

(1) A film support from polyethylene terephthalate of 100μ thickness and provided on its backside with the usual photographic adhesive and antihalation layers. The front side is covered successively with:

(2) A stripping film in proportion of 1 liter per 36 sq. m. applied according to the knife coating system from the following solution:

| | |
|---|---|
| Copoly(butadiene/acrylonitrile) (60/40) _____g__ | 25 |
| Methylene chloride _____cm.$^3$__ | 250 |
| 1,2-dichloroethane _____cm.$^3$__ | 500 |
| Ethyl acetate _____cm.$^3$__ | 225 |

This layer is dried at 80° C.

(3) A hydrophobic flexible membrane applied from the following coating solution:

| | |
|---|---|
| Cellulose nitrate (K-value 30) _____g__ | 40 |
| Tricresyl phosphate _____g__ | 10 |
| Diethylether _____cm.$^3$__ | 200 |
| Ethanol _____cm.$^3$__ | 700 |
| n-Butanol _____cm.$^3$__ | 100 |

This layer is applied in such a way that after drying 600 mg. of cellulose nitrate are present per sq. m.

(4) A subbing layer which is applied in proportion of 1 liter per 45 sq. m. from the following coating composition:

| | |
|---|---|
| Gelatin _____g__ | 2 |
| Water _____cm.$^3$__ | 17 |
| Acetic acid _____cm.$^3$__ | 1 |
| Methanol to 1000 cm.$^3$. | |

An orthochromatic gelatino-silver chlorobromide emulsion layer (18 mol percent of bromide) free from hardening agents with a ratio of gelatin to silver nitrate of 3/1, and which is applied in such a way that 21 g. of gelatin are present per sq. m. of light-sensitive material.

B. *Manufacture of the etching resist*

The gravure film is successively exposed through a continuous-tone transparency and a gravure screen whereupon it is tanning developed, fixed and washed. Then the emulsion side of the gravure film is brought into contact with the copper roller to be etched. During all these treatments the polyester film support takes care of a good dimensionl stability. From the moment the gravure film strongly sticks to the copper roller, the polyester film support is removed easily by stripping off. Afterwards the hydrophobic membrane is removed according to a method described in the above French patent specification and the non-exposed and hence non-hardened parts are washed away, so that finally only the etching resist remains on the copper roller.

EXAMPLE 3

Example 2 is repeated but the stripping layer is applied according to the knife coating system in proportion of 1 liter per 40 sq. m. from the following solution:

| | |
|---|---|
| Copoly(butadiene/acrylonitrile/styrene) (40.8/29.2/30) _____ g__ | 10 |
| 1,2-dichloroethane _____ cm.$^3$__ | 500 |
| Methylene chloride _____ cm.$^3$__ | 250 |
| Ethyl acetate _____ cm.$^3$__ | 200 |
| Methylglycol acetate _____ cm.$^3$__ | 50 |

This layer is dried at 70° C.

What I claim is:

1. A photographic light-sensitive element comprising in the indicated sequence (1) a polyester film base, (2) a stripping layer containing a copolymerization product comprising recurring units of a diolefine and a compound selected from the group consisting of acrylonitrile and methacrylonitrile, the amount of recurring units of said compound selected from the group consisting of acrylonitrile and methacrylonitrile being comprised between 5 and 60% by number of the total amount of recurring units of said copolymerization product, (3) a hydrophobic flexible membrane and (4) a light-sensitive silver halide emulsion layer.

2. A photographic light-sensitive element comprising in the indicated sequence (1) a polyester film base, (2) a stripping layer comprising copoly(butadiene/acrylonitrile), the amount of recurring acrylonitrile units being comprised between 5 and 60% by number of the total amount of recurring units of said copoly(butadiene/acrylonitrile), (3) a hydrophobic flexible membrane and (4) a light-sensitive silver halide emulsion layer.

3. A photographic light-sensitive element comprising in the indicated sequence (1) a polyester film base, (2) a stripping layer containing a copolymerization product comprising recurring units of styrene, a diolefine and a compound selected from the group consisting of acrylonitrile and methacrylonitrile, the amount of recurring units of said compound selected from the group consisting of acrylonitrile and methacrylonitrile being comprised between 5 and 60% by number of the total amount of recurring units of said copolymerization product, (3) a hydrophobic flexible membrane and (4) a light-sensitive silver halide emulsion layer.

4. The element of claim 1 wherein said amount of recurring units of said compound is about 22% to 40% by number of the total amount of recurring units.

5. The element of claim 1 wherein the essential film-forming constituent of said hydrophobic flexible membrane is a cellulose ester.

6. The element of claim 1 wherein said film support is polyethylene terephthalate.

7. The element of claim 1 wherein said hydrophobic flexible membrane has a plasticizing agent incorporated therein.

8. The element of claim 1 including an adhesive subbing layer disposed between said membrane and said emulsion layer.

9. The element of claim 2 including a gelatin subbing layer disposed between said membrane and said emulsion layer.

10. The element of claim 3 including a gelatin subbing layer disposed between said membrane and said emulsion layer.

References Cited by the Examiner

UNITED STATES PATENTS

| | | | |
|---|---|---|---|
| 2,831,783 | 4/1958 | Swiss et al. | 117—138.8 |
| 2,836,494 | 5/1958 | Overman | 96—87 |

NORMAN G. TORCHIN, *Primary Examiner.*

R. H. SMITH, *Assistant Examiner.*